United States Patent
Bow et al.

[15] 3,705,494
[45] Dec. 12, 1972

[54] HOLDING SYSTEM FOR STEAM POWER CYCLE

[72] Inventors: William J. Bow, Morris Township, Morris County; Richard J. Pollard, Kendall Park, both of N.J.

[73] Assignee: Fester Wheeler Corporation, Livingston, N.J.

[22] Filed: Jan. 4, 1971

[21] Appl. No.: 103,453

[52] U.S. Cl. .............................60/105, 60/1, 60/95
[51] Int. Cl. ...........................F01n 7/00, F01k 13/02
[58] Field of Search............................60/95, 105, 1

[56] References Cited

UNITED STATES PATENTS

| | | |
|---|---|---|
| 3,003,321 | 10/1961 | Warth.................................60/95 X |
| 3,019,774 | 2/1962 | Beyerlein.............................60/95 |
| 3,194,020 | 7/1965 | Hanzalek.............................60/95 X |
| 3,243,961 | 5/1966 | Caracristi............................60/105 |
| 3,358,450 | 12/1967 | Schroedter..........................60/105 |
| 3,537,265 | 11/1970 | Brown.................................60/95 X |

*Primary Examiner*—Martin P. Schwadron
*Assistant Examiner*—Allen M. Ostrager
*Attorney*—John Maier, III, Marvin A. Naigur and John E. Wilson

[57] ABSTRACT

A system and method for maintaining a power plant at stand-by or holding status for indefinite or extended periods of time wherein a relatively small portion of steam is circulated through the power plant to maintain the low pressure portion of the power plant at an elevated temperature above, and a pressure below, atmospheric conditions. The addition of steam also heats, seals, and purges the low pressure portion of the plant of non-condensible vapors.

12 Claims, 1 Drawing Figure

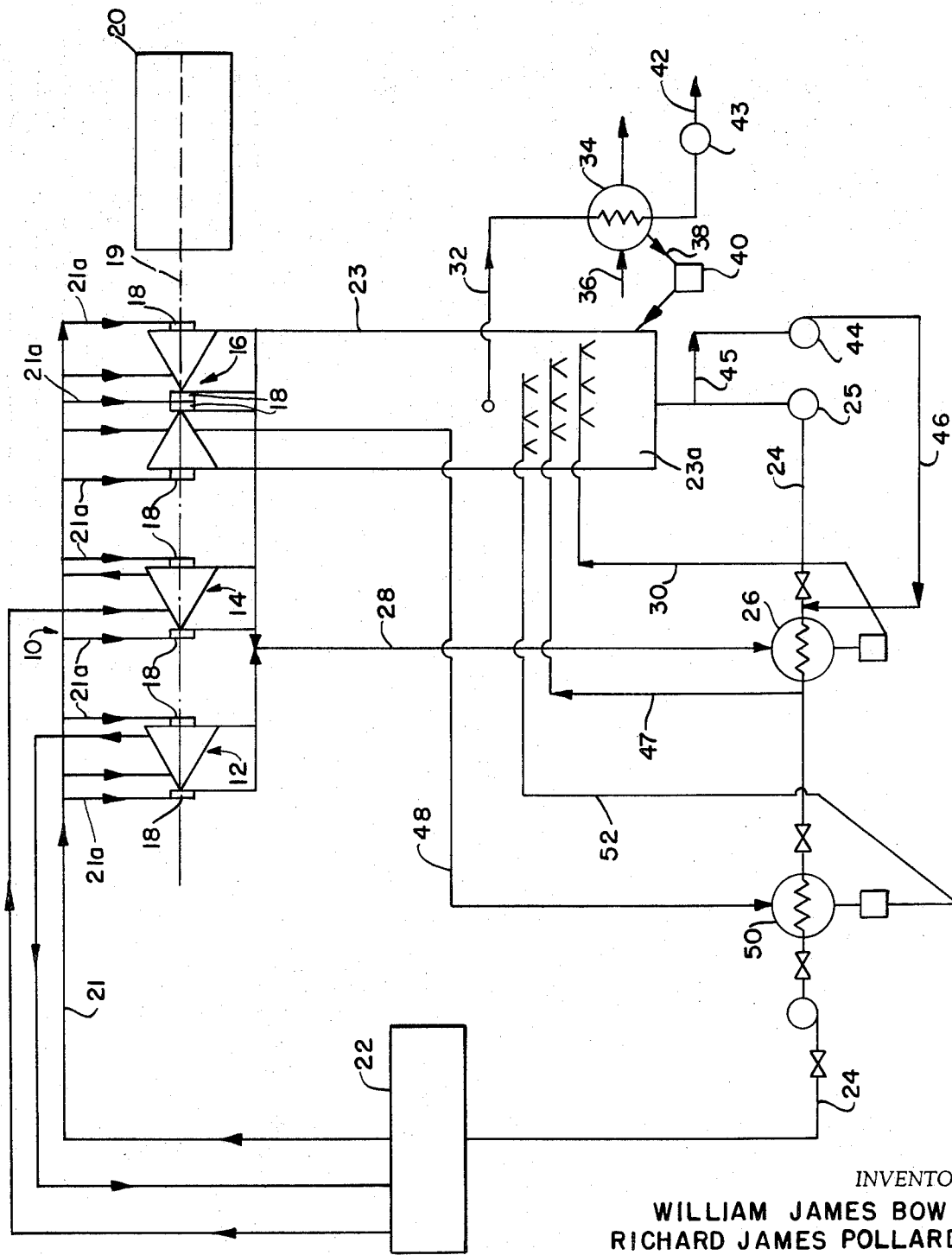

# HOLDING SYSTEM FOR STEAM POWER CYCLE

BACKGROUND OF THE INVENTION

This invention relates to a power plant system and, more particularly, to such a system where large energy producing equipment and machinery is used for power production during periods of peak demand.

In a steam power plant used for peaking purposes, extended periods of inoperation are required. The time and cost of start-up and shut-down therefore become a major factor of design consideration. Although power plants utilize heat energy supplied by a steam generator in an efficient manner during operation, the repetitive start-up procedure on a daily basis requires nonproductive expenditures of energy which are wasteful and inefficient.

During inoperation, means have been determined to hold the high pressure portion of the power plant at stand-by by banking or storing heat energy at high temperature and pressure by isolating the high pressure system. The low pressure portion of the cycle, however, is generally exposed to atmospheric pressure and results in contamination of processed condensate by air and other gases which must be reprocessed to avoid premature failure of the equipment.

SUMMARY OF THE INVENTION

It is therefore an object of the present invention to provide a means which reduces entry of air and other undesirable gases which contaminate the power plant system and to provide a means of eliminating these gases from the low pressure portion of the power plant.

It is a further object of the present invention to provide a system of the above type which will maintain the low pressure portion of the power plant at an elevated temperature above and pressure below atmospheric conditions during stand-by, or inoperation, of the power plant, which minimizes wasteful expenditures of energy and time required to reach operational start-up conditions.

Toward the fulfillment of these objects, the system of the present invention comprises means to introduce steam to the gland seals of the turbine portion of the power plant whereby a portion of said steam enters the cavities of said turbine portion, means to circulate the remaining portion of said steam through the system to the condenser portion of said plant to maintain said condenser portion at a predetermined start-up temperature, and means to remove the non-condensible vapors from said remaining portion of said steam.

BRIEF DESCRIPTION OF THE DRAWING

Reference is now made to the accompanying drawing, for a better understanding of the nature and objects of the present invention. The drawing illustrates the best mode presently contemplated for carrying out the objects of the invention and is not to be construed as restrictions or limitations on its scope. The drawing is a schematic diagram of a steam power plant incorporating the system of the present invention.

BRIEF DESCRIPTION OF THE PREFERRED EMBODIMENT

Referring specifically to the drawing, the reference numeral 10 refers, in general, to a steam turbine having a high-pressure portion 12, an intermediate-pressure portion 14, and a low-pressure portion 16.

A plurality of gland seals 18 are associated with each turbine portion, and operate to seal the turbine portion from atmosphere by utilizing at least one annular channel (not shown) provided in the region of the turbine casing and surrounding the rotor, or output shaft 19 in a conventional manner. The shaft 19 is adapted to drive an electrical generator 20.

Other standard components associated with a power plant of this type include a steam boiler 22 connected to a condenser 23 via a line 21. The condenser 23 is connected to the low-pressure portion 16 of the turbine, and condenses the steam from the turbine and passes same into the boiler 22 via the line 24 by means of a main condensate pump 25.

In normal operation, the boiler 22 generates steam which is fed to the turbine and returned to the boiler for reheating by main steam line 21. Branch lines 21a feed steam from the main lines 21 to seals 18, whereby the steam enters the turbine 10 to drive same and therefore the generator 20.

The present invention comes into operation during shutdown of the main system described above, and in accordance therewith, a predetermined amount of steam from the boiler 22 is introduced to the gland seals 18 and a portion of the steam passes into the evacuated cavities of the turbine 10 to blanket same. A gland seal steam condenser 26 is connected to the gland seals 18 via a line 28, and receives that portion of the steam from the gland seals which does not enter the turbine. It is understood that the use of the word "steam" at this stage is meant to include both the vapor from the boiler 22, along with air and other non-condensible gases which are collected by the vapor.

As a result of passing through the condenser 26 the steam from the gland seals 18 condenses and the condensate is directed into the main condenser 23 by a line 30. Although the condenser 23 is shut down, a portion of this condensate will flash back into steam due to the lower temperature of the condenser 23 relative to the condenser 26. This latter steam will be drawn, via a line 32, to a pre-cooler condenser 34. A coolant, such as service water from a line 36, is passed through the condenser 34 which condenses this steam, and the resulting condensate is returned into the hot-well portion 23a of the condenser 23 via a line 38 and a pump 40. The non-condensible portion of the steam at the condenser 34, including the air and other gases originally present in the gland seals 18, is vented to the atmosphere through the line 42 by a pump 43.

The condensate from the condenser 26 that does not flash into steam in the condenser 23 remains in the hot-well portion 23a of the latter condenser.

A pump 44 draws condensate from the hot-well portion 23a of the condenser 23 via a branch line 45 and introduces same through the tubes of the gland seal condenser 26. Since the temperature of the condensate at the hot-well portion 23a is less than the temperature of the steam passing into the condenser 26 from the gland seals 18 via the line 28, the steam is condensed, as discussed above. After passing through the tubes of the condenser 26, the condensate from the line 46 is directed into the condenser 23 via a line 47 whereby it combines with the condensate from the line 30 and is thus treated in the same manner as discussed above.

The steam passing from the gland seals 18 into the evacuated cavities of the low-pressure portion 16 of the turbine will be exhausted from the latter via a line 48 into a heat exchanger 50 which is at a substantially lower temperature than that of the steam. The steam is thus condensed and the resulting condensate passed into the condenser 23 by the line 52, whereby it combines with the condensate from the lines 30 and 47. It is understood that the heat exchanger 50 can be in the form of one or more low pressure feedwater heaters, as well as one or more steam jet air ejectors and/or drain coolers.

Steam passing through the turbine cavity in the low-pressure portion 16 of the turbine 10 will be exhausted directly into the condenser 23, whereby it will combine with the steam that is flashed from the condensate entering the condenser via the lines 30, 47 and 52 and will thus be passed to the precooler condenser 34. Although not specifically shown in the drawing, it is understood that vent steam from the high-pressure portion 12 and the intermediate portion 14 of the turbine 10 will also be introduced to the condenser 23 and treated in an identical manner.

The above operation thus eliminates the undesirable non-condensible vapors, such as oxygen, from the system by driving them out of the gland seals and venting them to the atmosphere.

Further, the presence of the condensate in the hotwell 23a maintains the condenser 23 at an elevated temperature during inoperation, which thus minimizes the energy and time required for start-up.

Of course, other variations of the specific construction and arrangement of the steam turbine system disclosed above can be made by those skilled in the art without departing from the invention as defined in the appended claims.

What is claimed is:

1. A steam power plant including a turbine portion, gland seals associated with said turbine portion, and a main condenser for condensing the steam from said turbine portion, wherein the improvement comprises a system for maintaining said plant at stand-by during inoperation thereof, said system comprising means to introduce steam to said gland seals, an additional condenser for condensing the exhaust steam from said gland seals to form a condensate, means to direct said exhaust steam from said gland seals to said additional condenser, and means to direct said condensate from said additional condenser to said main condenser, said main condenser being maintained in an inoperable mode in a manner to induce flashing of a portion of said condensate into vapor.

2. The improvement of claim 1 further comprises means to direct the remaining portion of said condensate at said main condenser to said additional condenser where it passes in a heat exchange relation to said exhaust steam.

3. The improvement of claim 2 wherein said remaining portion of said condensate is directed back into said main condenser after passing through said additional condenser.

4. The improvement of claim 1 further comprises means for condensing said vapor flashed in said main condenser to separate the condensed water vapor from the non-condensible vapors.

5. The improvement of claim 4 further comprising means for directing said condensed water vapor back into said main condenser, and means to vent said non-condensible vapors.

6. The improvement of claim 1 further comprising means to condense the steam that exhausts from said cavities of said turbine portion to form an additional condensate, and means to direct said additional condensate into said main condenser.

7. A method for maintaining a steam power plant at stand-by during inoperation of said plant, said method comprising the step of introducing steam to the gland seals of the turbine portion of said plant, directing the exhaust steam from said gland seals through an auxiliary condenser to condense said exhaust steam into a condensate, directing said condensate from said auxiliary condenser to the main condenser of said plant, and maintaining said main condenser in an inoperable mode in a manner to induce flashing of a portion of said condensate into vapor.

8. The method of claim 7 further comprising the step of directing the remaining portion of said condensate at said main condenser to said auxiliary condenser where it passes in a heat exchange relation to said exhaust steam.

9. The method of claim 8 further comprising the step of directing said remaining portion of said condensate back into said main condenser after passing through said auxiliary condenser.

10. The method of claim 7 further comprising the step of condensing said vapor flashed in said main condenser to separate the condensed water vapor from the non-condensible vapors.

11. The method of claim 10 further comprising the steps of directing said condensed water vapor back into said main condenser, and venting said non-condensible vapors.

12. The method of claim 7 further comprising the steps of condensing the steam that exhausts from said cavities of said turbine portion to form an additional condensate, and directing said additional condensate into said main condenser.

* * * * *